June 4, 1963     J. R. WULLERT     3,092,718
SYNCHRO SHAFT POSITION ENCODER
Filed Nov. 29, 1960     4 Sheets-Sheet 1

INVENTOR.
JOHN R. WULLERT
BY
ATTORNEY

INVENTOR.
JOHN R. WULLERT
ATTORNEY

United States Patent Office 3,092,718
Patented June 4, 1963

3,092,718
SYNCHRO SHAFT POSITION ENCODER
John R. Wullert, Hartsville, Pa., assignor to the United States of America as represented by the Secretary of the Navy
Filed Nov. 29, 1960, Ser. No. 72,533
8 Claims. (Cl. 235—154)
(Granted under Title 35, U.S. Code (1952), sec. 266)

The invention herein described may be manufactured and used by or for the Government of the United States of America for governmental purposes without the payment of any royalties thereon or therefor.

This invention relates to synchro shaft position encoders and more specifically to apparatus for deriving from the position of synchro shaft signals in digital form compatible for use with computers.

The problem of transforming a synchro shaft position to a digital number is one that has been present in the art for a considerable time. One method of transforming synchro shaft position into a digital number involves the use of a coded disk which is driven by a motor which receives its energy through a transformer, the primary side of which receives its energy from the rotation of the synchro shaft. When the synchro shaft attains a position, a control transformer is rotated to provide an output to drive the motor which positions the coded disk. The coded disk is represented by patterns of conducting and nonconducting areas appearing on concentric channels which are so arranged that a unique combination corresponds to each position of the shaft. A pulse is then sent to the conducting area of the disk and if a pulse is read out it means the brush is on a conducting area, and when there is no pulse out it means a nonconducting area is being contacted by the brush. This combination of pulse or no pulse provides a unique binary representation for each shaft position. The disadvantage of this type of encoder is that a separate coded disk arrangement is required for each synchro shaft whose position is to be encoded. Thus, if there are a number of synchro shafts whose positions are to be encoded the equipment involved becomes expensive and bulky.

Another method by which a synchro shaft position can be converted into digital form involves utilizing the sinusoidal output of the synchro and comparing it with the sinusoidal output of a reference voltage. The phase difference between each sinusoidal output would be an indication of the synchro shaft position. The time interval between a point on the sinusoidal output of the synchro shaft and an exact corresponding point in a sinusoidal output of the reference signal would be an indication of the synchro shaft position. When this time interval is counted by using a counter and a fixed frequency clock pulse source, the indication on the counter is a digital form of the interval and, therefore, a digitalized form of the synchro shaft position. A disadvantage of this type of synchro shaft position encoder is in the relatively long encoding period required. The present invention is an improvement over this method of encoding wherein the encoding time may be cut to as much as one-fourth of the coding time needed in this prior method.

Therefore, the general purpose of this invention is to provide synchro shaft position encoder which embraces all the advantages of similarly employed prior art devices and possesses none of the aforementioned disadvantages. To this end the present invention contemplates generating two pulses for each cycle of the sinusoid generated by the synchro shaft which may be compared to two pulses generated by the sinusoidal output of a reference voltage source, wherein by a unique arrangement of a counter, a source of clock pulses, and gate circuits any one of a plurality of intervals may be measured, each one of which would be an indication of the synchro shaft position.

Therefore, it is an object of the present invention to provide an improved position encoder for synchro shafts.

Another object of the invention is to provide a synchro shaft position encoder which is less bulky than prior synchro shaft position encoders.

A further object of the invention is to provide an improved synchro shaft position encoder which requires one-half and one-fourth as much time for encoding as formerly required by prior art devices.

Still another object of the present invention is to provide a synchro shaft position encoder which may be used in a computer system.

Other objects and many of the attendant advantages of this invention will be readily appreciated as the same becomes better understood by reference to the following detailed description when considered in connection with the accompanying drawings in which like reference numerals designate like parts throughout the figures thereof and wherein FIG. 1 is a view in block form of the system for converting the output of each synchro and also the output of the reference voltage generator into pulse form.

Figure 1:
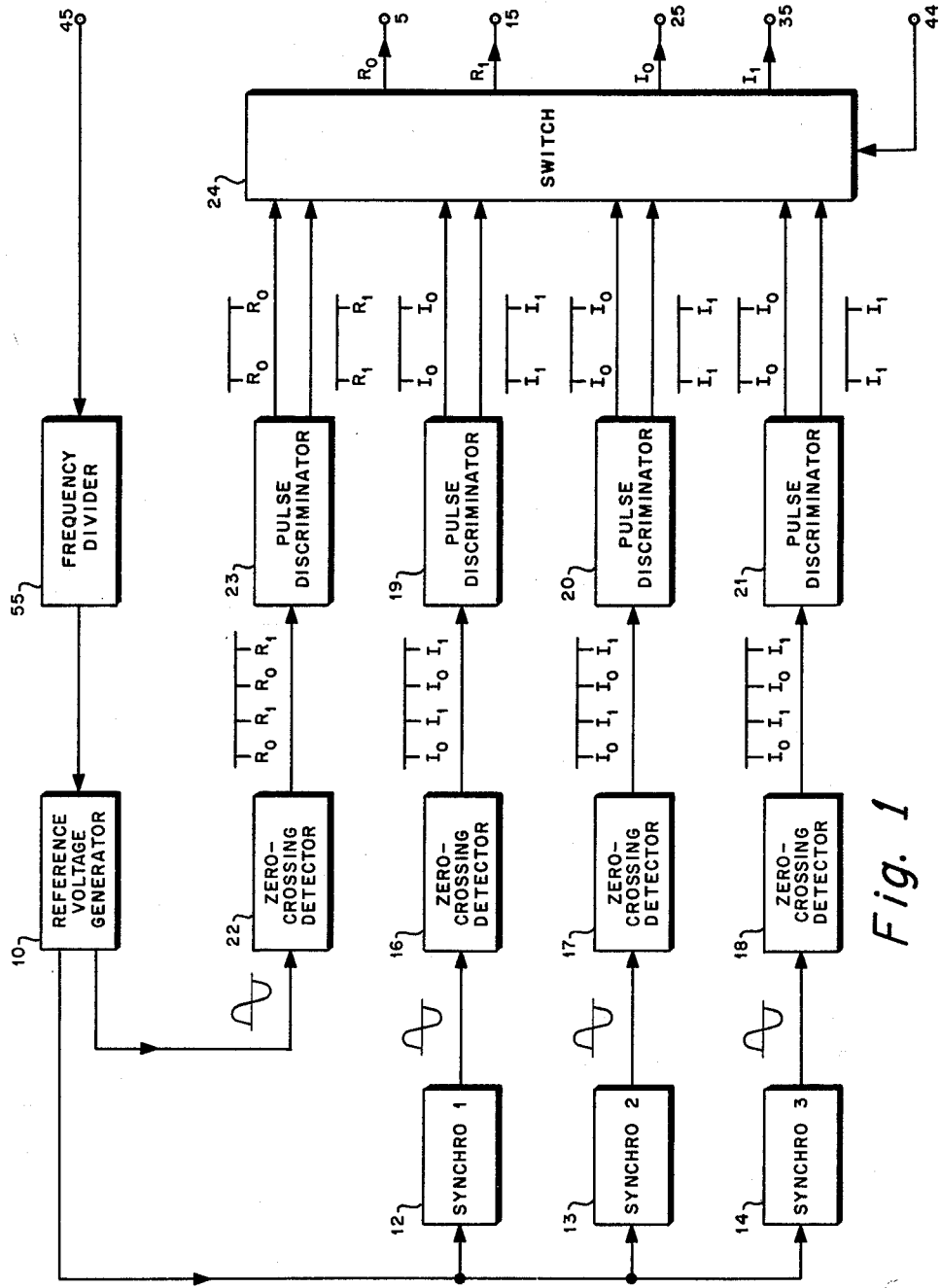

Referring now to the drawings wherein like reference characters designate like or corresponding parts throughout several views, there is shown in FIG. 1 the system for encoding the synchro sinusoidal output into pulse form where a reference voltage generator 10 has an output common to the synchros 12, 13, and 14. Each synchro generates a sinusoidal output having a phase relationship proportional to its respective shaft position. The sinusoidal output of each synchro 12, 13, and 14 is fed into zero crossing detectors 16, 17, and 18 which have the function of producing an information pulse $I_0$ when the sinusoidal output of the synchro crosses the zero axis in a positive direction and an information pulse $I_1$ when the sinusoidal output of the synchros crosses the zero axis in a negative direction, so that for each cycle of the sinusoidal output of each synchro two information pulses are produced. These information pulses which appear at the output of zero crossing detectors 16, 17, and 18 are then fed into pulse discriminators 19, 20, and 21, wherein the information pulses produced by positive crossing of the zero axis are separated from the information pulses produced when the sinusoidal output crosses zero axis in a negative direction and wherein one output of the pulse discriminators 19, 20, and 21 contain only positive crossing zero axis information pulses and the other output contains only negative crossing information pulses. All the information pulses so produced and discriminated are fed into a switch 24 having an input from the computer which selects which synchro is to have its shaft position encoded. The reference voltage generator 10 has another output, sinusoidal in nature, which is fed into a zero crossing detector 22 similar to the zero crossing detectors 16, 17, and 18 which produces a reference pulse $R_0$ when the reference pulse crosses the zero axis in a positive direction and a reference pulse $R_1$ when the sinusoidal output from the reference voltage generator crosses the zero axis in a negative direction so that each full cycle of the sinusoidal output of the reference voltage generator generates two reference pulses. These reference pulses are fed into pulse discriminator 23 identical in function to the pulse discriminators 19, 20, and 21 and the reference pulses $R_0$ are then applied to the switch 24 through one output of the pulse discriminator 23 and the reference pulses $R_1$ are applied to the switch through the other output of the pulse discriminator. The output pulses $R_0$, $R_1$, $I_0$, $I_1$ from the switch 24 are then available as input pulses to either of the two encoder systems depending upon which one is used, as readily seen by reference to the drawings as described hereinafter.

FIGURE 1 also shows a terminal 45, and as will be seen hereinafter, the terminal 45 connects the source of clock pulses in either FIG. 2 or FIG. 3 with the frequency divider 55 which, of course, provides the input to reference voltage generator 10.

Figure 2:
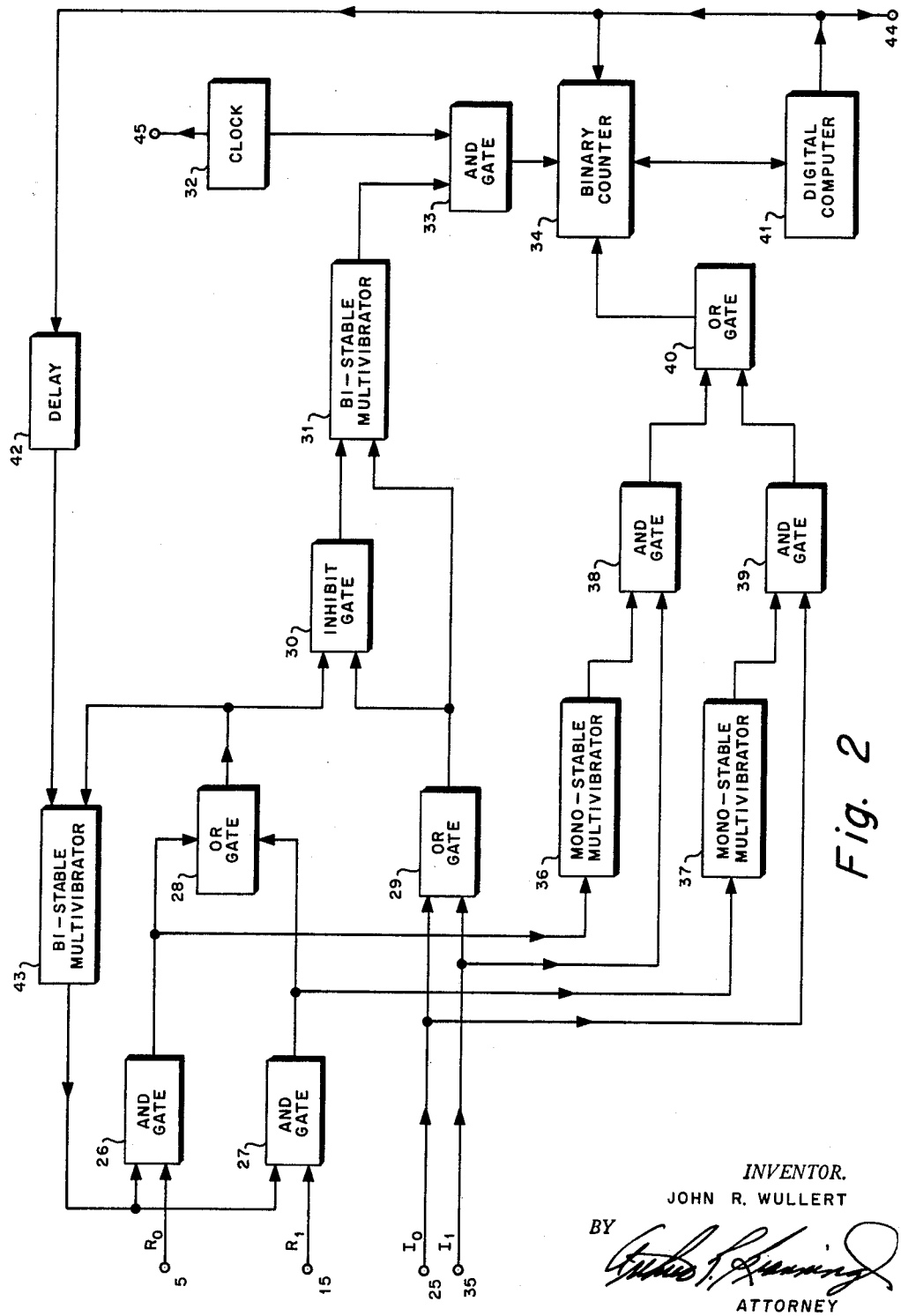
FIG. 2 is a first embodiment of the position encoder utilizing the outputs of FIG. 1.

With reference to FIG. 2 which illustrates a first embodiment for a synchro shaft position encoder for use with the outputs of FIGS. 1, it is seen that each reference pulse input and each information pulse input is clearly related to the description of FIG. 1 and that FIG. 2 is essentially a continuation of FIG. 1. Digital computer 41 is connected through a delay element 42 to a bistable multivibrator 43, which has an output common to and gates 26 and 27 as shown in the drawing. And gates 26 and 27 have as their second input the terminals which carry the pulses $R_0$ and $R_1$, respectively. And gate 26 has an output terminal which is common to or gate 28 and monostable multivibrator 36, while and gate 27 has an output terminal which is common to or gate 28 and monostable multivibrator 37. Or gate 28 is connected to bistable multivibrator 43 through its output terminal and also to inhibit gate 30 which has an output connected to the input of bistable multivibrator 31. Or gate 29, which is connected to the two input terminals carrying the information pulses $I_0$ and $I_1$, has an output terminal common to both inhibit gate 30 and bistable multivibrator 31, the bistable multivibrator 31 having an output terminal connected to one input of and gate 33. Clock pulse generator 32 supplies the second input to and gate 33. And gates 38 and 39 each have an input terminal connected to the terminals which carry the information pulses $I_1$ and $I_0$ wherein information pulse $I_0$ is connected to and gate 39 and information pulse $I_1$ is connected to and gate 38. And gates 38 and 39 each have an output which is fed into or gate 40. Or gate 40 and and gate 33 each have output terminals connected to the input of a binary counter 34. Terminal 44 connects digital computer 41 to switch 24 shown in FIG. 1.

Operation of the embodiment disclosed in FIG. 2 in conjunction with FIG. 1 is as follows: Digital computer 41 will through terminal 44 selectively determine which synchro will be compared with the reference voltage for the purpose of encoding the position of the synchro shaft into digital form. In the interest of brevity this discussion of operation will involve the synchro 12 since synchros 13 and 14 operate in a manner identical to the operation of synchro 12. At the same time digital computer 41 also emits a start pulse which is delayed somewhat in delay 42 to set bistable multivibrator 43 and supply an input to and gates 26 and 27, thus making each ready to receive either a reference pulse $R_0$ or $R_1$, whichever one arrives first. When a reference pulse $R_0$ or $R_1$ arrives it passes through and causes and gate 26 or and gate 27 to emit a pulse to or gate 28 which functions to reset bistable multivibrator and thus remove one input to and gates 26 and 27, thereby removing the possibility of a next arriving reference pulse from pulsing or gate 28. The pulse from or gate 28 also passes through inhibit gate 30 to bistable multivibrator 31 which supplies the second input to and gate 33 which thereby starts the counting operation and allows clock pulses from clock pulse generator 32 to pass through and gate 33 to be counted by binary counter 34. Either information pulse $I_0$ and $I_1$ is then effective to reset bistable multivibrator 31 to remove the input from gate 33 and thereby stop the binary counter from counting clock pulses.

Figure 4:
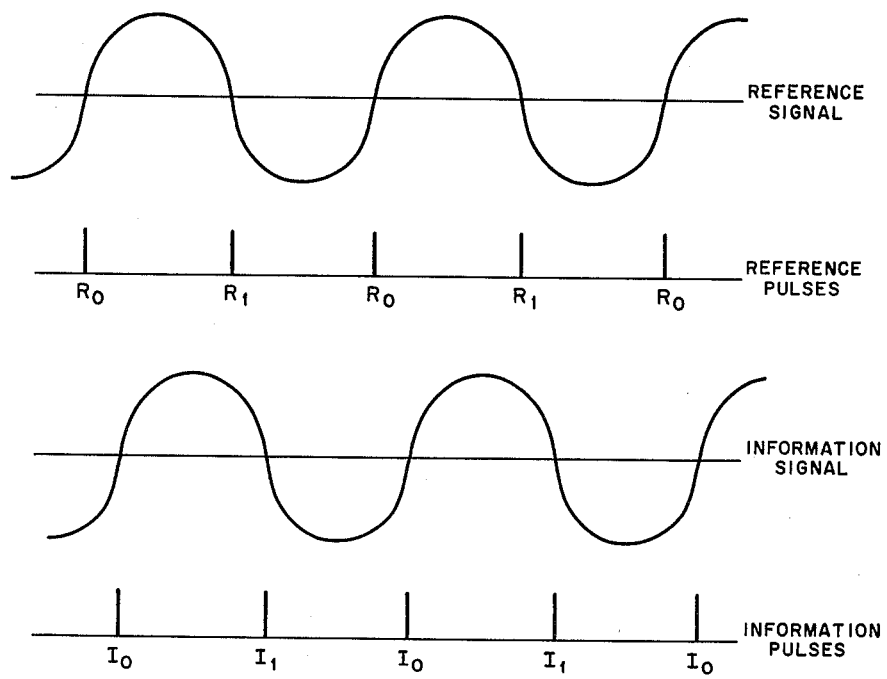
FIG. 4 represents the phase relationship between the reference signal and the information signal.

By referring to FIG. 4 it is seen that there are four conditions of operation for FIG. 2. These are as follows:

(1) measurement of the time interval between $R_0$ and $I_0$ or $R_1$ and $I_1$.

(2) measurement of the time interval between $R_0$ and $I_1$ or $R_1$ and $I_0$.

(3) simultaneous occurrence of $R_0$ and $I_1$ or $R_1$ and $I_0$.

(4) simultaneous occurrence of $R_0$ and $I_0$ or $R_1$ and $I_0$.

The second condition introduces an error of 180° into the time interval. The third condition indicates the synchro shaft is at a zero position. The fourth condition indicates the synchro shaft is 180° out of the zero position.

At the start of an encoding operation digital computer 41 sends out a pulse to set bistable multivibrator 43 which provides an input to each of and gates 26 and 27. The pulse from computer 41 also serves, through switch 24, to select the synchro whose shaft position is to be encoded. The description which follows will take into account each specific condition.

When an $R_0$ pulse is followed by an $I_0$ pulse, and gate 26 emits a pulse through or gate 28 which resets bistable multivibrator 43 which prevents an $R_1$ pulse or another $R_0$ pulse from coming in. Or gate 28 also provides an output through inhibit gate 30 to bistable multivibrator 31 to and gate 33 to start clock pulses from clock pulse generator 32 to begin being counted by binary counter 34. Now, any information pulse, either an $I_0$ or an $I_1$, whichever one is first occurring would, through or gate 29 and bistable multivibrator 31, provide a pulse to and gate 33 to thereby stop the counting of binary counter 34. In this case, however, only the $I_0$ pulse is considered. When an $R_1$ pulse is followed by an $I_1$ pulse the operation is identical as discussed hereinabove except that and gate 27 rather than and gate 26 is involved.

In the case where an $R_0$ pulse happens to be followed by an $I_1$ pulse it is apparent from the waveforms in FIG. 4 that an error of 180° or its equivalent is counted by binary counter 34. Thus, a provision must be made for introducing into binary counter a correction factor to nullify this ambiguity. Such is done in the following manner. For the condition where an $R_0$ pulse is followed by an $I_1$ pulse, it can be seen that the output from and gate 26 is also connected to monostable multivibrator 36, while the terminal carrying the $I_1$ pulse is connected not only through gate 29 but also to and gate 38. Thus, when an $R_0$ pulse is followed by an $I_1$ pulse, and gate 38 will emit a pulse through or gate 40 to introduce the necessary correction factor into binary counter 34. The condition where an $R_1$ pulse is followed directly by an $I_0$ pulse function is identical to the above except that monostable multivibrator 27 and and gates 17 and 29 are involved. Thus, it can be seen that the interval is first measured and then a correction factor is introduced into binary counter 24 when the $R_0$ pulse is followed by an $I_1$ pulse or when the $R_1$ pulse is followed by an $I_0$ pulse. It is further pointed out and readily apparent from the drawing that this is an automatic operation.

For the condition when an $R_0$ pulse and $I_0$ pulse occur simultaneously it can be seen that these pulses, because they occur simultaneously, are inhibited from reaching bistable multivibrator by inhibit gate 30. Thus, for this condition the interval is zero and no count is made which indicates a zero shaft position. When an $R_0$ pulse occurs simultaneously with an $I_1$ pulse or an $R_1$ pulse occurs simultaneously with an $I_0$ pulse, it can be seen by reference to FIG. 4 that a time interval or phase discrepancy of 180° exists. For such a condition because of the function of inhibit gate 30 and gate 33 will not allow any clock pulses to be counted by binary counter 34. However, since for this condition there is a 180° difference between the information and reference pulses, it must be corrected. This is taken care of by the same correction factor inserting network which was described above. For instance, when an $R_0$ pulse occurs simultaneously with an $I_1$ pulse and gate 38 is energized to emit a pulse through or gate 40 and thereby introduce the necessary correction factor into binary counter 34. When an $R_1$ pulse occurs simultaneously with an $I_0$ pulse, it can be seen that and gate 39 receives the two inputs necessary to cause a correction factor to be inserted into binary counter 34. This operation is also completely automatic.

Figure 3:
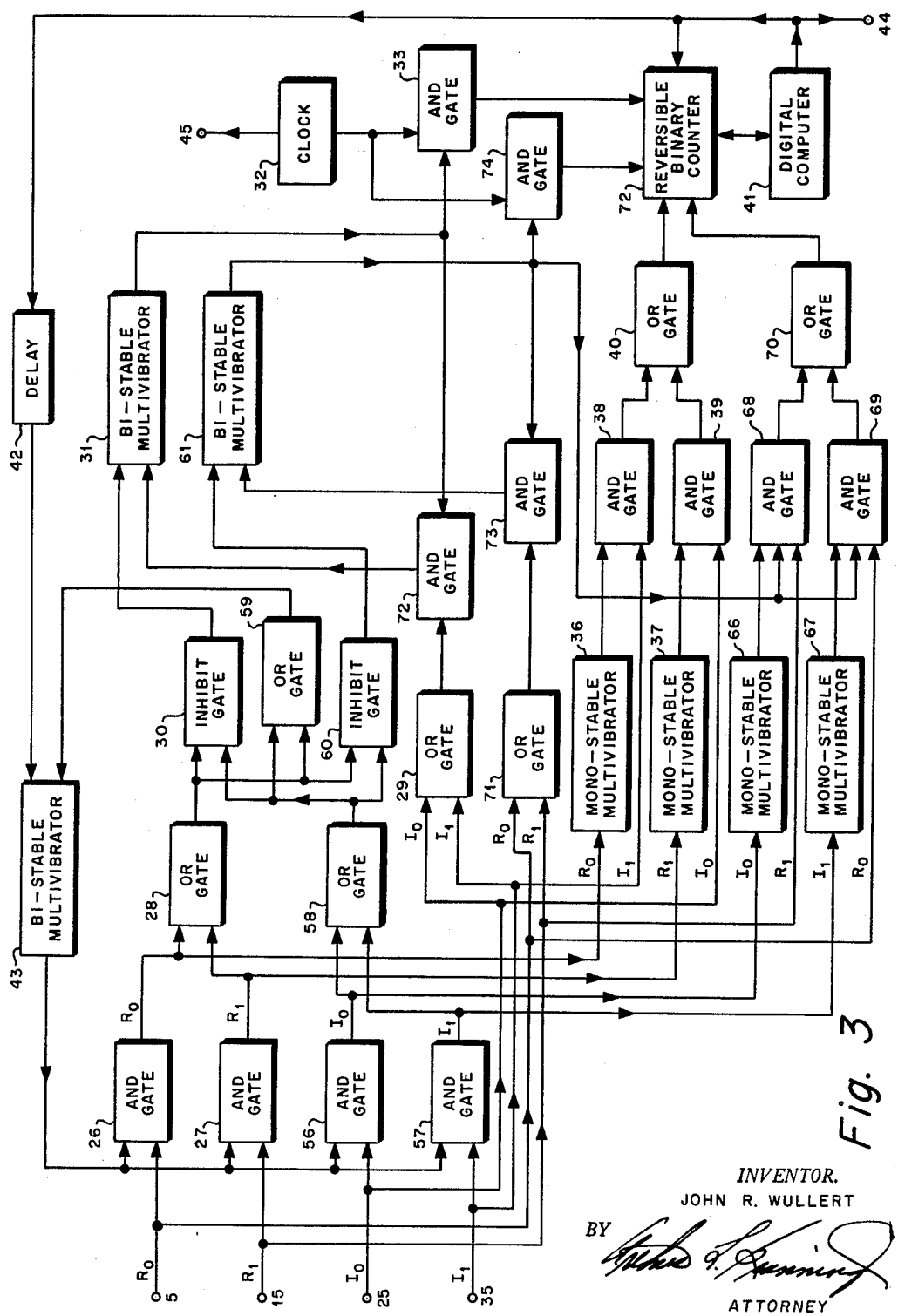
FIG. 3 is a second embodiment of the synchro shaft position encoder also utilizing the outputs of FIG. 1.

FIG. 3 is a block diagram representation of the second embodiment of this invention. The function is quite similar to the function of the system as shown and described in reference to FIG. 2. The chief difference is in the use of a reversible binary counter which makes it possible to measure not only the interval between any reference pulse and any information pulse but also the interval between any information pulse and any reference pulse. In other words, each information pulse is also capable of starting the counting operation. Inasmuch as FIG. 3 is similar to FIG. 2 like reference numerals have been used wherever possible. FIG. 3 functions in a manner identical to FIG. 2 but with the addition or added feature that it can measure also the interval between information pulses and reference pulses, whereas the system of FIG. 2 is limited to measuring the interval between reference pulses and information pulses. As can be seen from FIG. 3, the bistable multivibrator 43 has an output common to and gate circuits 26, 27, 56, 57. Thus, a command pulse from digital computer 41 will set bistable multivibrator to apply one of the inputs to each of the and gates 26, 27, 56 and 57. And gates 26 and 27 each may have a second input of $R_0$ and $R_1$, respectively, as in the first embodiment, while in addition and gates 56, 57 have their second input through the terminals carrying $I_0$ and $I_1$. And gate 26 has an output common to or gate 28 and monostable multivibrator 36, while and gate 27 has an output common to or gate 28 and monostable multivibrator 37. And gate 56 has an output common to or gate 58 and monostable multivibrator 66, while and gate 57 has an output common to or gate 58 and monostable multivibrator 67. Or gate 28 has an output terminal common to inhibit gate 30, or gate 59 and inhibit gate 60, while or gate 58 has an output also common to inhibit gate 60, or gate 59, and inhibit gate 30. Inhibit gate 60 and inhibit gate 30 have outputs connected to bistable multivibrator 61 and bistable multivibrator 31, respectively. Or gate 58 has an output connected to bistable multivibrator 43 used to reset bistable multivibrator 43 and remove one of the inputs from each of and gates 26, 27, 56 and 57 once any one of the and gates 26, 27, 56 and 57 has passed a pulse. Bistable multivibrators 31 and 61 are each effective to start reversible binary counter 72 to count either in a positive direction when the clock pulses are gated through and gate 33, or in a negative direction when the clock pulses are gated through and gate 74. From the foregoing, it can be seen that either an $R_0$, $R_1$, $I_0$ or an $I_1$ pulse is effective to start the counting process.

The terminals carrying the pulse $R_0$ and $R_1$ each are connected to or gate 71 which has an output terminal leading to and gate 73 and at the same time the terminals carrying the pulses $R_0$ and $R_1$ are connected respectively to and gate 69 and and gate 68. The terminals carrying information pulses $I_0$ and $I_1$ are each connected to or gate 29 which in turn is connected to and gate 72. The terminals carrying the $I_0$ and $I_1$ pulses are further connected to and gates 39 and 38, respectively. Bistable multivibrator 31 has an output connected to and gates 33, 72 while bistable multivibrator 61 has an output connected to and gates 74, 73 which output is also connected to and gates 68 and 69. And gates 38 and 39 have output terminals common to or gate 40, while and gates 68 and 69 have output terminals common to or gate 70. Or gates 40 and 70 have output terminals common to reversible binary counter 72.

Description of the operation of the system disclosed in FIG. 3 is as follows: On command of a pulse from digital computer 41 bistable multivibrator 43 is set to provide one input to each of the four gates 26, 27, 56 and 57, thereby enabling the first arriving of any one of the reference pulses $R_0$ and $R_1$ or the information pulses $I_0$ and $I_1$ to pass through its respective and gate and thence through or gate 59 to reset bistable multivibrator 43 to remove one input to and gates 26, 27, 56 and 57 to thus prevent the passing of any additional pulses to start the operation of the encoder. If it is an $I_0$ or an $I_1$ pulse which first arrives respectively at and gates 56 or 57, the first arriving pulse will pass through or gate 58, inhibit gate 60, to set bistable multivibrator 61 to supply an input to and gate 74 whereby clock pulses are passed through and gate 74 and counted by reversible binary counter 72, but in a negative direction.

The conditions under which the embodiment of FIG. 3 operate automatically are identical with the conditions under which the embodiment of FIG. 2 operates, but in addition the embodiment shown in FIG. 3 can also handle the interval between information pulses and reference pulses. Whereas the system illustrated in FIG. 2 is capable of measuring four separate time intervals the system represented by FIG. 3 is capable of measuring eight separate time intervals.

If an information pulse is the first to arrive after an encode command, gate 56 or gate 57 provides an output to set bistable multivibrator 61 and to reset bistable multivibrator 43. An $I_0$ pulse triggers monostable multivibrator 66 and an $I_1$ pulse triggers monostable multivibrator 67. Since bistable multivibrator 61 is set it provides the second input to gate 74 which permits clock pulses to flow into the counter and be counted in the reverse direction, that is, a series of subtractions by ones. Bistable multivibrator 61 also provides an input to gates 73, 68, and 69. The input to and gate 73 caused by an information pulse provides an output to reset bistable multivibrator 61 upon arrival of an R pulse and thus stop the flow of clock pulses into the counter. Since the time intervals measured by this system are between any reference pulse and the succeeding information pulse or between any information pulse and the succeeding reference pulse, it is possible for the number in the counter at the end of operation to be in error by the binary equivalent of 180°. This error is the resultant count which occurs when the following time intervals are measured: (1) the time interval between an $R_0$ and $I_1$ pulse; (2) the time interval between an $R_1$ and an $I_0$ pulse; (3) the time interval between an $I_0$ pulse and an $R_1$ pulse; (4) the time interval between an $I_1$ and an $R_0$ pulse. This error is corrected by sensing and remembering the start pulses with monostable multivibrators 36, 37, 66, 67. If the counter is started with an $R_0$ or an $R_1$ pulse monostable multivibrator 36 or 37 is triggered respectively. Upon the arrival of an $I_1$ or $I_0$ pulse gates 38 or 39, respectively, provide an output to set to proper correction in the counter. If the counter is started by an $I_0$ or an $I_1$ pulse monostable multivibrator 66 or 67 is respectively triggered. When an $R_1$ or an $R_0$ pulse arrives, gate 68 or 69 respectively provide an output to set the proper correction to the counter.

The addition of these logical elements insures that the number in the counter at the end of an encoding operation is directly proportional to the position of the particular synchro shaft. Some ambiguities may arise when the synchro is at 0° since two pules are generated for each cycle of excitation frequency. When the synchro shaft is at 0°, $R_0$ and $I_0$ or $R_1$ and $I_1$ are coincident. Cross coupling is provided between inhibit gates 30 and 60 to prevent any ambiguity from arising. The cross coupling prohibits the counter from starting when $I_0$ or $I_1$ and $R_0$ or $R_1$ pulses occur simultaneously. Under these conditions the counter is prohibited from starting when the synchro shaft is positioned at 0° and at 180°. When the synchro shaft is a 0° the counter will contain a zero.

When the synchro shaft is at 180° gates 38 and 39 will provide an output to set the counter to the binary equivalent at 180°. However, to prevent further ambiguities it was necessary to make gates 68 and 69 three input "and" gates to prevent the most significant bit of the counter from being set and reset at the same time at 180°.

In the interest of clarity, the discussion of the operation of the embodiment of FIG. 3 will be amplified. When an $R_0$ pulse is followed by an $I_1$ pulse, the $R_0$ pulse sets monostable multivibrator to provide one input to and gate 38. The $I_1$ pulse supplies the second input to and gate 38. The resulting pulse from and gate 38 will then change the count of counter 72 by an amount equivalent to a positive 180° correction. When an $R_1$ pulse is followed by an $I_0$ pulse, the identical function, as described above, takes place but with monostable multivibrator 37 and and gate 39 performing the function.

When an $I_0$ pulse, starting the interval is followed by an $R_1$ pulse, the $I_0$ pulse sets monostable multivibrator 66 to provide and gate 68 with a first input. The $R_1$ pulse supplies the second input to and gate 68. The resulting pulse from and gate 68 will change the count of counter in the negative sense by an amount equivalent to the 180° correction. When an $I_1$ pulse is followed by an $R_0$ pulse the identical function as described above takes place except monostable multivibrator 67 and and gate 69 are involved. It should be noted that when bistable multivibrator 61 is set to the start state by an I pulse and gates 68 and 69 have a third input. Therefore, simultaneous occurrence of an $R_0$ and an $I_1$ pulse or of an $R_1$ and $I_0$ pulse will cause a correction factor to be inserted in counter 72 through or gate 40 only. Thus, without the third input to and gates 68 and 69, the above mentioned simultaneous occurrence of pulses would cause a correction factor to be inserted in counter 72 through or gate 70, which would result in cancellation of the correction factor caused by the circuit involving or gate 40.

Thus, it can be seen that the time saved in an encoding operation, such as employed in FIG. 3, where eight possible intervals may be measured to determine in digital form the shaft position is one-fourth the time required for a similar encoding operation of the prior art device.

Various other objects and advantages will appear from the following description of the two embodiments of this invention and the novel features will be particularly pointed out hereinafter in connection with the appended claims.

What is claimed is:

1. In combination with a computer, a synchro shaft position encoder for transforming the position of a synchro shaft into a binary number, a synchro shaft and a reference shaft, first means responsive to rotation of said synchro shaft for generating a first sinusoid, second means connected to said first means for producing a first synchro pulse when said first sinusoid crosses the zero axis a first time and a second synchro pulse when said first sinusoid crosses the zero axis a second time, third means responsive to rotation of said reference shaft for generating a second sinusoid, fourth means connected to said third means for producing a first reference pulse when said second sinusoid crosses the zero axis a first time and a second reference pulse when said reference sinusoid crosses the zero axis a second time, encoder means connected to said second and fourth means receiving said first and second synchro pulses and said first and second reference pulses for transforming the phase difference between any one of said first or second reference pulses and any one of said first or second synchro pulses into digital form, said encoder means including corrector means providing a correction to the transforming function when said phase difference is defined by said first reference pulse and said second synchro pulse or said second reference pulse and said first synchro pulse.

2. In a shaft position encoder for transforming the time interval between a first or a second occurring reference pulse and a first or a second occurring information pulse into a digital code in combination: a source of reference pulses, a source of information pulses, a source of clock pulses, counter means for counting said clock pulses, gate circuit means connected between said source of clock pulses and said counter means, first means connecting said source of reference pulses to said gate circuit means for transmitting the first occurring of said first or said second reference pulse to said gate circuit means whereby said counter means is started counting said clock pulses, second means connecting said source of information pulses to said gate circuit means for transmitting the first occurring information pulse subsequent to the start of counting to said gate circuit means whereby said counter means is stopped counting said clock pulses, third means coupled to said counter means for inserting a correction factor into said counter means when said first reference pulse and said second information pulse determines the interval to be counted, and fourth means coupled to said counter means for inserting a correction factor into said counter means when said second reference pulse and said first information pulse determines the interval to be counted.

3. In a shaft position encoder for transforming a time interval between any one of a plurality of reference pulses and any one of a plurality of information pulses or a time interval between any one of a plurality of first or second information pulses and any one of a plurality of first or second reference pulses wherein said time interval between said one reference pulse and said one information pulse or said time interval between said one information pulse and said one reference pulse is indicative of a shaft position, comprising in combination: a source of clock pulses, a reversible counter, gate circuit means connected between said source of clock pulses and said reversible counter and responsive upon receipt of an information or reference pulse to control operation of said reversible counter, first means transmitting a first arriving reference or information pulse to said gate circuit means whereby said reversible counter is started counting said clock pulses in a positive direction when said first arriving pulse is a reference pulse and in a negative direction when said first arriving pulse is an information pulse, second means transmitting the next arriving information or reference pulse to said gate circuit means whereby said reversible counter is stopped counting clock pulses by an information pulse for the condition of being started by a reference pulse and whereby said reversible counter is stopped counting clock pulses by a reference pulse for the condition of being started by an information pulse, third means coupled to said reversible counter for inserting a correction factor into said reversible counter when the interval to be measured is defined by a first reference pulse being followed by a second information pulse or a second reference pulse being followed by a first information pulse, fourth means coupled to said reversible counter for inserting a correction factor into said reversible counter when the interval to be measured is defined by a first information pulse being followed by a second reference pulse or a second information pulse being followed by a first reference pulse, whereby the count registered on said reversible counter being a digital indication of said shaft position.

4. In a shaft position encoder for transforming a phase difference between a first or a second reference pulse and a first or a second information pulse or between a first or a second information pulse and a first or a second reference pulse wherein said phase difference between said first or said second reference pulse and said first or said information pulse or between said first or said second information pulse and said first or said second reference pulse is an indication of said shaft position, in combination: a source of reference pulses, a source of information pulses, a source of clock pulses, a reversible binary counter, gate circuit means connected between said source of clock pulses and said reversible counter and responsive upon receipt of an information pulse or a reference pulse to control operation of said reversible counter, first means coupled to each of said sources of information and reference pulses and said gate circuit for transmitting the first occurring of said first or said second reference pulse or said first or said second information pulse to said gate circuit means whereby said reversible counter starts counting said clock pulses in a positive direction when said first or said second reference pulse is transmitted first and in a negative direction when said first or said second information pulse is transmitted, second means coupled to said first means and responsive to the first arriving reference pulse or information pulse to prevent transmitting any subsequent pulses, third means connected to said gate circuit means for transmitting said first or said second information pulse to stop said reversible counter from counting in the positive direction for the condition when said reversible counter was started by a reference pulse, fourth means connected to said gate circuit means for transmitting said first or said second reference pulse to stop said reversible counter from counting in the negative direction for the condition when said reversible counter was started by an information pulse, correction means connected to said counter and responsive when said first reference pulse occurs coincident with said second information pulse or when said second reference pulse occurs coincident with said first information pulse to insert a predetermined correction factor into said reversible counter, the count on said reversible counter being indicative of said phase difference and said shaft position.

5. A shaft position encoder for use with a computer for transforming the position of a synchro shaft into digital code comprising: a synchro shaft and a reference shaft, first means responsive to rotation of said synchro shaft for generating a first sinusoid, a first zero crossing detector connected to said first means for producing a first synchro pulse when said first sinusoid crosses the zero axis a first time and a second synchro pulse when said first sinusoid crosses the zero axis a second time, second means responsive to rotation of said reference shaft for generating a second sinusoid, a second zero crossing detector connected to said second means for producing a first reference pulse when said second sinusoid crosses the zero axis a first time and a second reference pulse when said second sinusoid crosses the zero axis a second time, a counter, a source of clock pulses, gate circuit means connected between said counter and said source of clock pulses and responsive to said synchro and said reference pulses to control operation of said counter, first circuit means connected to said second zero crossing detector for transmitting the first occurring of said first or said second reference pulse to said gate circuit means whereby said counter starts counting said clock pulses, second circuit means connected to said first zero crossing detector for transmitting the first occurring of said first or said second synchro pulse to said gate circuit means subsequent to said counter being started whereby said counter stops counting said clock pulses, and means connected to said counter and responsive to said first synchro pulse coincident with said second reference pulse or said first reference pulse coincident with said second synchro pulse for inserting a predetermined correction into said counter, whereby the final count on said counter is indicative of said synchro shaft position.

6. A shaft position encoder for use with a computer for transforming the position of a synchro shaft into a digital code comprising: a synchro shaft and a reference shaft, first means responsive to rotation of said reference shaft for generating a first sinusoid, a first zero crossing detector connected to said first means for producing a first reference pulse when said first sinusoid crosses the zero axis in a positive direction and a second reference pulse when said first sinusoid crosses the zero axis in a negative direction, second means responsive to rotation of said synchro shaft for generating a second sinusoid, a second zero crossing detector connected to said second means for producing a first information pulse when said second sinusoid crosses the zero axis in a positive direction and a second information pulse when said second sinusoid crosses the zero axis in a negative direction, a source of clock pulses, a reversible binary counter, gate circuit means connected between said source of clock pulses and said reversible counter and responsive upon receipt of an information pulse or a reference pulse to control operation of said reversible counter, first circuit means connected to said first and second zero crossing detectors for transmitting said first or said second reference pulse or said first or said second information pulse to said gate circuit means whereby said reversible counter is started counting said clock pulses in a positive direction when said first or said second reference pulse is the first occurring pulse and in a negative direction when said first or said second information pulse is the first occurring pulse, second circuit means coupled to said first circuit means and responsive to the first arriving reference pulse or information pulse to prevent transmitting to said gate circuit means any subsequent pulses to start a count, third circuit means connected to said gate circuit means for transmitting said first or said second information pulse to stop said reversible counter counting for the condition when said reversible counter was started by a reference pulse, fourth circuit means connected to said gate circuit means for transmitting said first or said second reference pulse to stop said reversible counter for the condition when said reversible counter was started by an information pulse, correction means connected to said reversible counter for inserting a predetermined correction factor into said reversible counter when said first or said second reference pulse is respectively followed by said second or said first information pulse or when said first or said second information pulse is respectively followed by said second or said first reference pulse, whereby the count on said reversible counter is a true indication of said synchro shaft position.

7. A synchro shaft position encoder, comprising in combination: a source of clock pulses, a counter, gate means connecting said source of clock pulses and said counter, a source of reference pulses generating a first and a second reference pulse, a source of information pulses including a synchro for generating a first and a second information pulse, first circuit means coupled to said source of reference pulses and said gate means for transmitting the first occurring of said first or said second reference pulses to said gate means whereby said counter is started counting said clock pulses, second circuit means coupled to said source of information pulses and said gate means for transmitting said first occurring information pulse subsequent to the start of the counting operation to said gate means whereby said counter is stopped from counting said clock pulses, said first circuit means and said second circuit means having included therein inhibit circuit means responsive to the simultaneous occurrence of any reference pulse with any information pulse for preventing said counter from starting counting said clock pulses, third circuit means coupled to said source of reference pulses, said source of information pulses, and said counter, responsive to the condition of said first reference pulse being followed by said second information pulse or the simultaneous occurrence thereof for inserting a predetermined correction factor into said counter, fourth circuit means coupled to said source of reference pulses, said source of information pulses, and said counter, responsive to the condition when said second reference pulse is followed by said first information pulse or the simultaneous occurrence thereof to insert said predetermned correction factor into said counter.

8. A synchro shaft position encoder, comprising in combination, a source of clock pulses, a reversible binary counter, gate means connecting said source of clock pulses to said counter, a source of reference pulses generating a first and a second reference pulse, a source of information pulses including a synchro providing a first and a second information pulse each having a position indicative of synchro shaft position, first circuit means coupled to said source of reference pulses and said gate means for transmitting the first occurring of said reference pulses to said gate means whereby said counter is started counting clock pulses in a positive direction, second circuit means coupled to said source of information pulses and said gate means for transmitting the first occurring of said information pulses to said gate means whereby said counter is started counting in a negative direction, third circuit means connected in said first circuit means and said second circuit means and responsive to the first occurring of any one of said reference or information pulses to prevent subsequent occurring of said reference or information pulses from being transmitted to said gate means to start the counting operation, fourth circuit means coupled to said source of information pulses and said gate means for transmitting the first occurring information pulse subsequent to the start of counting to said gate means whereby said counter is stopped counting for the condition when the counter was started by a reference pulse, fifth circuit means coupled to said source of reference pulses and said gate means for transmitting the first occurring reference pulse subsequent to the start of counting to said gate means whereby said counter is stopped counting for the condition when the counter was started by an information pulse, inhibit circuit means connected to each of said sources of information and reference pulses and said gate means and responsive to the coincidence of any reference pulse with any information to prevent said counter from starting, a first circuit connecting said source of reference pulses and said source of information pulses to said counter and responsive to the condition when a first reference pulse is followed by a second information pulse or to the coincidental occurrence thereof to insert a predetermined correction factor into said counter, a second circuit connecting said source of reference pulses and said source of information pulses to said counter and responsive to the condition when a second reference pulse is followed by a first information pulse or the coincidental occurrence thereof to insert a predetermined correction factor into said counter, a third circuit connecting said source of reference pulses and said source of information pulses to said counter and responsive to the condition of a first information pulse being followed by a second reference pulse to insert a predetermined correction factor into said counter, a fourth circuit connecting said source of information pulses and said source of reference pulses and responsive to the condition when a second information pulse is followed by a first reference pulse to insert a predetermined correction factor into said counter.

References Cited in the file of this patent

UNITED STATES PATENTS 2,980,900    Rabin _____ Apr. 18, 1961

OTHER REFERENCES

Notes on Analog-Digital Conversion Techniques, Technology Press, 1957 (pp. 6–7 thru 6–29 by Ward relied on).